United States Patent [19]

Corcoran

[11] Patent Number: 5,031,992
[45] Date of Patent: Jul. 16, 1991

[54] MULTIPLE PARALLEL CHANNEL ROTARY OPTICAL COUPLER

[75] Inventor: John W. Corcoran, Los Altos, Calif.

[73] Assignee: Ampex Corporation, Redwood City, Calif.

[21] Appl. No.: 495,508

[22] Filed: Mar. 19, 1990

Related U.S. Application Data

[63] Continuation-in-part of Ser. No. 395,824, Aug. 18, 1989, abandoned.

[51] Int. Cl.⁵ .............................................. G02B 6/32
[52] U.S. Cl. ........................... 350/96.18; 250/227.24; 350/96.20
[58] Field of Search ............ 250/227; 350/6.4, 96.10, 350/96.15, 96.16, 96.18, 96.20, 96.21, 96.22, 321

[56] References Cited

U.S. PATENT DOCUMENTS

| | | | |
|---|---|---|---|
| 3,428,812 | 2/1969 | Burke | 350/6.4 X |
| 3,602,640 | 8/1971 | Maillet et al. | 250/227 X |
| 4,519,670 | 5/1985 | Spinner et al. | 350/96.15 |
| 4,753,506 | 6/1988 | Einhorn et al. | 350/96.15 |

Primary Examiner—John D. Lee
Attorney, Agent, or Firm—George B. Almeida

[57] ABSTRACT

A multi-channel rotary optical coupler incorporates a multi-element lens assembly formed of a coplanar plurality of annular convex lens elements, with each lens element of the assembly having a substantially constant annular width and a discrete optical axis, with each optical axis of each lens element radially displaced about a central rotational axis of the coupler. Each lens element receives an output from a respective data modulated light source and provides discrete data channels for the continuous transmission of discrete data signals through the lens elements to respective similarly radially displaced optical detectors of a detector array.

18 Claims, 4 Drawing Sheets

MULTI CHANNEL ROTARY
OPTICAL COUPLER

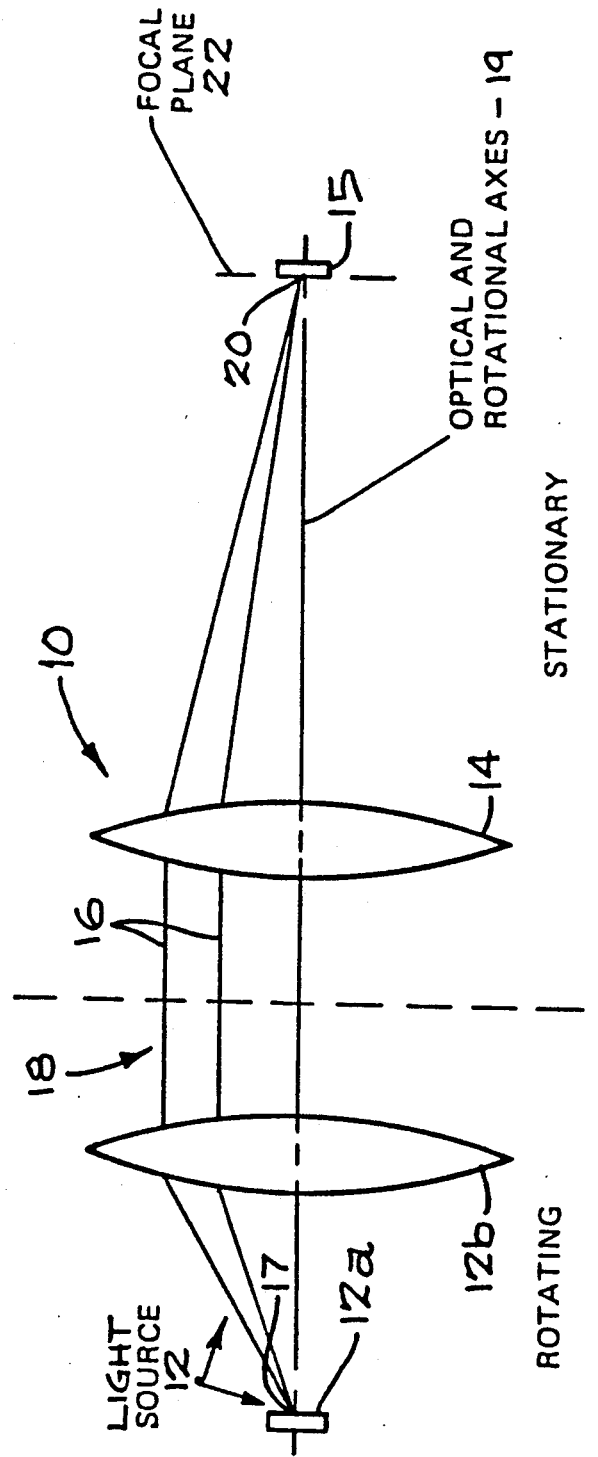
FIG_1
SINGLE CHANNEL ROTARY OPTICAL COUPLER

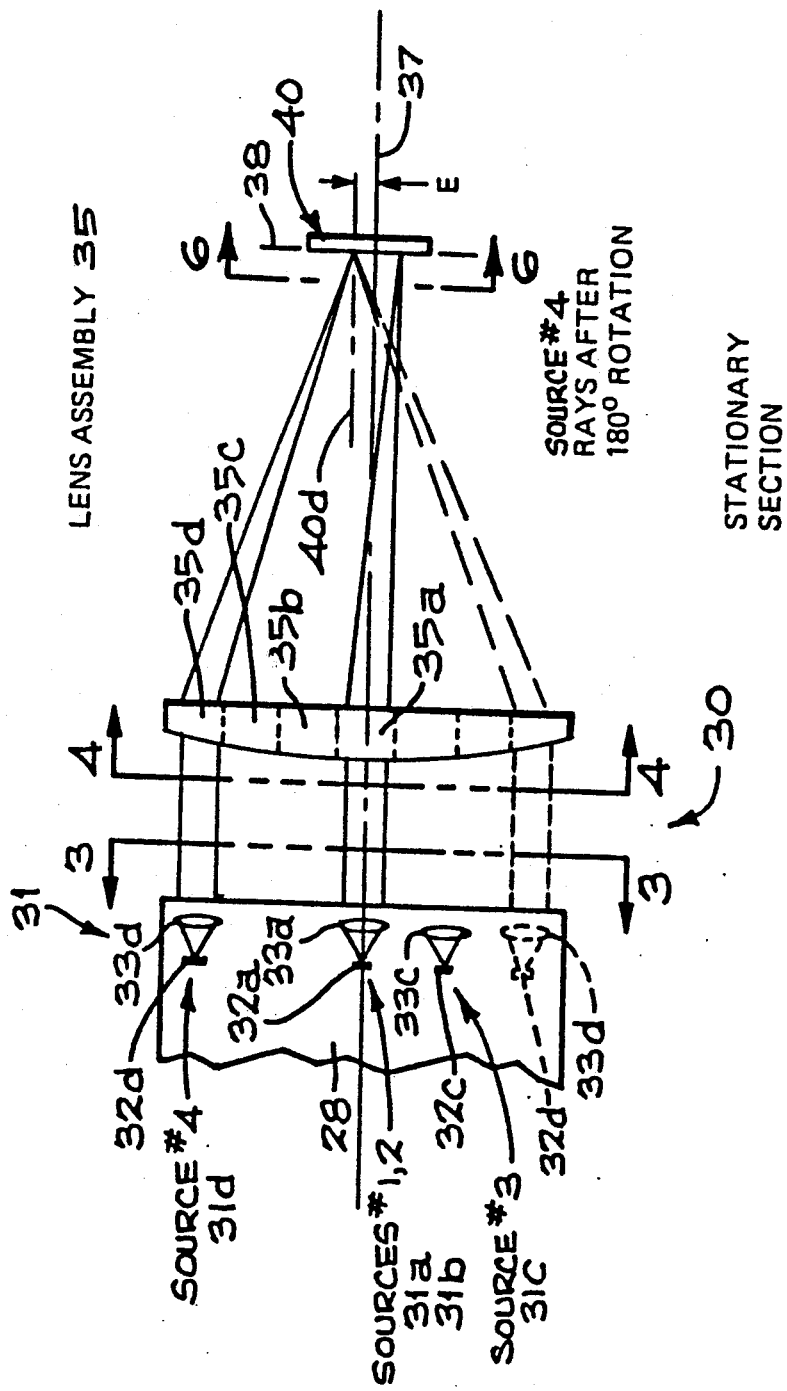

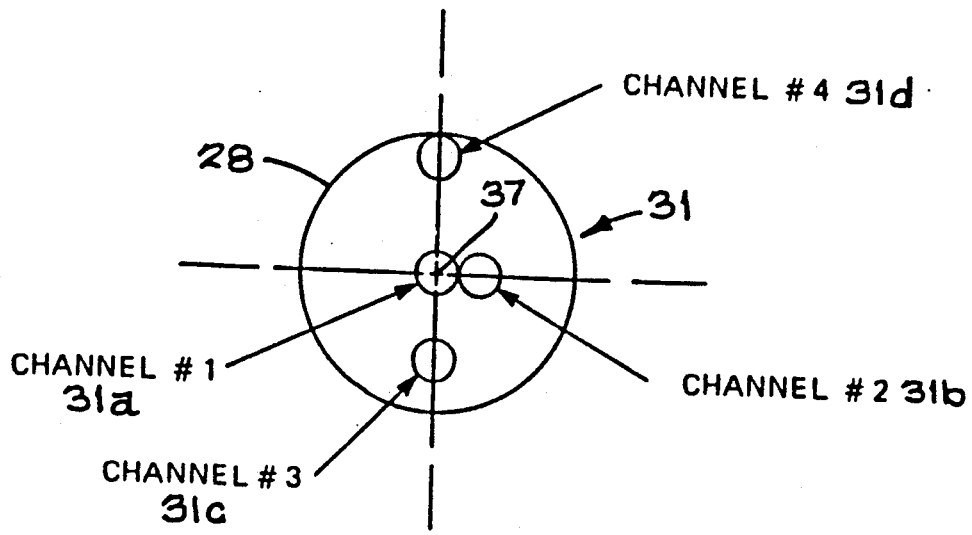
ARRANGEMENT OF LIGHT SOURCES ON ROTOR
FIG_3
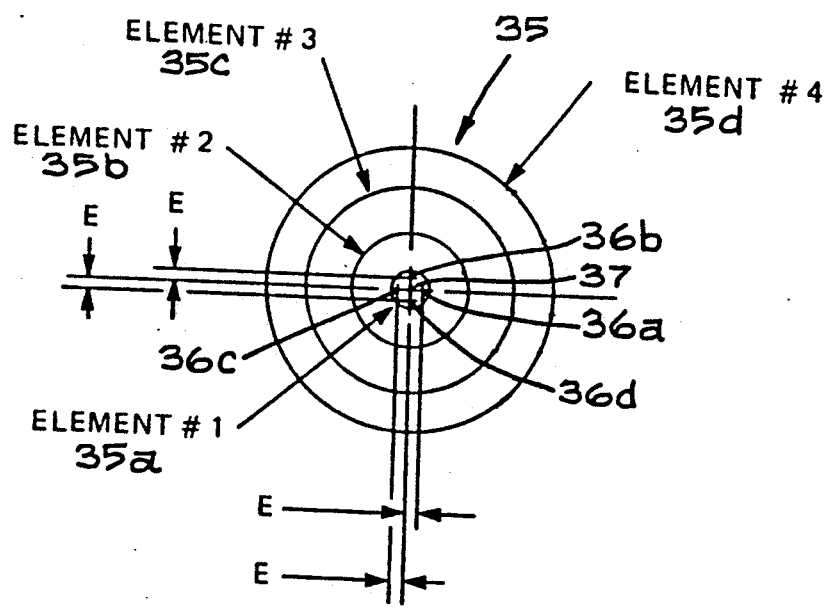
LENS ANNULI ASSEMBLY
FIG_4

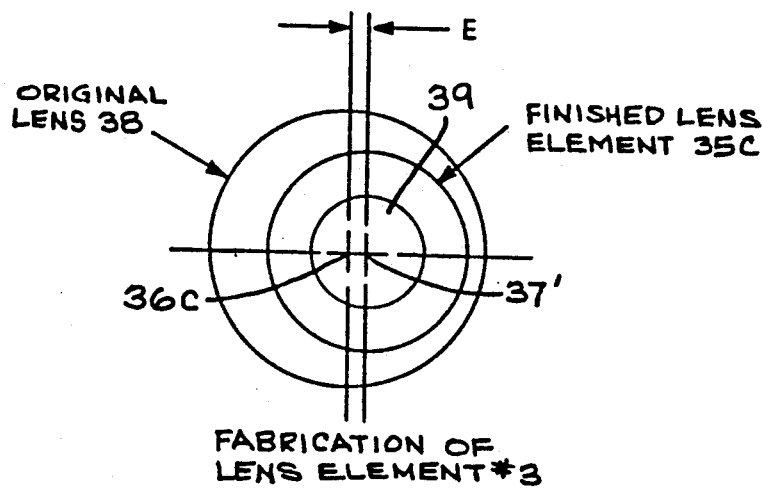
FIG_5
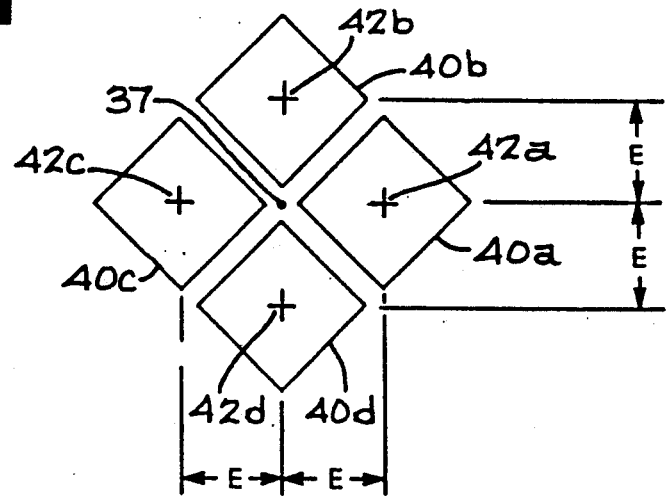
FIG_6
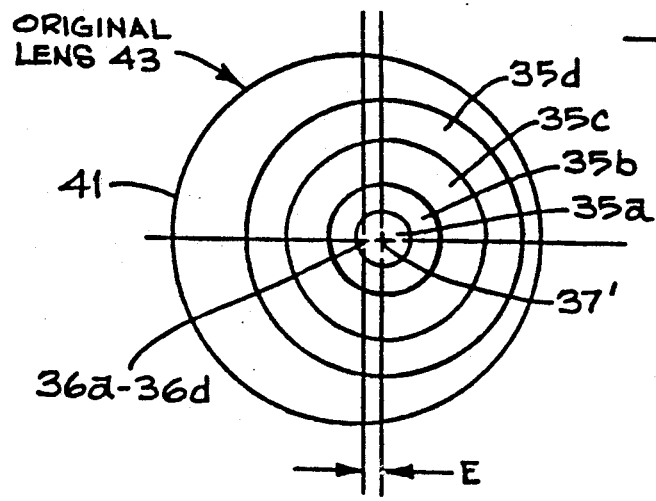
FIG_7

MULTIPLE PARALLEL CHANNEL ROTARY OPTICAL COUPLER

This application is a continuation-in-part of copending application Ser. No. 07/395,824 filed Aug. 18,1989, and now abandoned.

This invention relates to optical systems and in particular to a multi-channel optical system for rotary coupling of data signals using a multi-element lens assembly, wherein the optical axis of each lens element is radially displaced.

BACKGROUND OF THE INVENTION

It is a well known principle of optical systems that a collimated beam of parallel light rays which enter a convex lens at separate points on the curved face of the lens will be brought to a focus at the focal point of the lens. As long as the collimated rays are nearly parallel to the optical axis, the image plane is in the vicinity of the focal point, regardless of where a ray enters the lens. Rotation of the collinated beam about the optical axis of the lens, does not move the focal point nor the image focused in a plane at the focal point. When a single optical channel system transmits such a beam as a single stream of data bits, the system is adequate as long as the data transmission rate requirements can be accommodated by such a system.

However, to facilitate the practical data transmission of present very high data rates, it is necessary to simultaneously transmit multiple parallel channels of data to provide the corresponding substantial increase in the rate of data transmission. Because it is necessary to separate the discrete parallel optical channels of data which are to be simultaneously transmitted, a multiple optical channel system may fail because it does not provide adequate means of optical channel separation.

An example of an application where such increased rates of data transmission occur, is in the transmission of video, audio or other data, between the multiple heads in a rotating scanner assembly and the stationary signal processing system, of a video or data tape recorder/reproducer. At present, such recorder/reproducers electromagnetic rotary transformers of very restricted tolerances and attendant substantial expense, as further discussed below.

Although fiber optic networks can be used to transmit multiple channels of data from a source, such source typically is stationary, and is normally a single or point source. To date, a practical fiber optic network which is operative with a multi-channel, rotary data source to provide high data rate transmission, is not available. Further, the known art has not solved the problem of adequate channel separation when transmitting multiple parallel channels of data generated by a rotating source utilizing simple geometric methods and generally available components.

The rotary optical coupler is a superior alternative to the rotary transformer in applications where the output generated by, for example, the magnetic head signals of the magnetic tape recorder/reproducer of previous mention, are converted to data bit streams for transmission to a receiving source, because of the significant advantage which the rotary optical coupler provides with respect to the less stringent mechanical tolerances when compared to the rotary transformer. Although the rotary transformer transmits multiple parallel channels of data, the potential for channel crosstalk in such a system requires substantially tight mechanical tolerances, achieved at considerable expense. The axial tolerance between the rotating and stationary elements of an optical coupler may be greater than 20 mils instead of less than the 1 mil tolerances required in a rotary transformer. Likewise, in an optical coupler, radial tolerances of the light sources and lens annuli may be on the order of ±5 mils, a readily attainable and inexpensive requirement.

Accordingly, it would be highly desirable to provide a multi-channel rotary coupler for data signal transmission which offers the advantages of substantial cost savings with a design of relative simplicity using readily available optical components, while generally retaining the speed and optical resolution of a fiber optic network.

SUMMARY OF THE INVENTION

The rotary optical coupler of the present invention uses a stationary lens assembly comprising a multiplicity of annular lens elements in a unique lens assembly configuration. Although the optical axis of each lens element is aligned along a common rotational axis of the coupler, each lens element is radially displaced to provide a respective optical axis parallel to, but not colinear with, the common rotational axis of the coupler. In the preferred configuration, multiple data light sources rotate about the common rotational axis, but each individual, generally parallel path initiated by each respective data light source, forms a skewed cone whose vertex is off-center by the displacement of the optical axis of the respective stationary lens element. The data is transmitted via respective displaced lens elements to a stationary photo detector array of the rotary optical coupler. Each data light source thus supplies a respective data signal via a discrete channel, which transmits the data signal to a focal point located on a specific photo detector of the photo detector array. All detectors of the array lie in a common focal plane, and also are displaced about the common rotational axis of the coupler, commensurate with the displacements of the lens elements in respective optical channels.

As mentioned, the optical axis, and thus the center of curvature of each lens element, is displaced from the common rotational axis of the optical coupler, which enables the lens assembly to separate multiple, generally collimated, light beams into discrete parallel channels of data signals. Thus, discrete data signals are readily supplied to their respective photo detectors disposed in their common focal plane, with optimum channel and data signal separation.

The multi-element lens of the present invention differs substantially from the typical "nested" configuration common to certain other multi-element lens assemblies. Normally, as well known in the art, the desired lens assembly configuration is a plurality of concentric lens, wherein each lens element has a different radius of curvature, and is disposed in tandem along a common optical axis. In such lens configurations, it is imperative that the respective centers of curvature, that is, the optical axis of each respective lens element, be precisely aligned, to prevent the problem of spherical aberration.

Contrast the above-described arrangement with the arrangement of the present invention, in which a substantially different effect is achieved by employing a substantially opposite optical arrangement. That is, in the preferred embodiment of the present invention, the radius of curvature is the same for each lens element of the multi-element lens assembly, with each respective optical axis, though parallel to the rotational axis of the multi-element lens assembly, being displaced a select distance in different radial directions from the common rotational axis. This allows the lens assembly to direct a plurality of discrete data signals to respective photo detectors of the detector array, thereby overcoming the problems inherent in typical optical systems concerning providing discrete channels of data transmission from multiple rotating data sources to stationary photo detectors.

Thus, the invention provides for the transmission of a plurality of discrete data signals to and from rotating and stationary members, using the combination of a plurality of rotatable light sources to generate a corresponding plurality of generally parallel, collimated, light beams. The discrete light beams are supplied to respective displaced lens elements of the unique multi-element lens assembly, which focus the discrete light beams to separated focal points on a common focal plane. That is, discrete light-sensitive photo detector elements, which also are displaced from the common rotational axis but within the same focal plane, receive the discrete data signals via the respective channels formed by the multi-element lens assembly.

The proposed configuration offers a less complex and less costly approach when compared to an optical coupler using a fiber optic configuration. In the proposed configuration employing simple rotary optical coupler employing simple lenses replaces the substantially more complex fiber optic coupler. Because of the limited image field angles and apertures, high quality imagery can be obtained with the simple lens elements of the invention assembly.

The proposed invention may be better understood by a consideration of the detailed description of the invention taken together with the accompanying drawings, as described below.

DESCRIPTION OF DRAWINGS

FIG. 1 is a schematic representation of a single channel optical coupler;

FIG. 2 is a schematic representation of a multi-channel rotary optical coupler, illustrating a preferred embodiment of the present invention;

FIG. 3 is a section of an arrangement of light sources on a rotor taken along section lines 3—3 of FIG. 2;

FIG. 4 is a section of a multi-element lens assembly taken along section lines 4—4 of FIG. 2;

FIG. 5 is a schematic representation exemplifying a process for fabricating the lens elements using lens element 35c as an example.

FIG. 6 is a section taken along section lines 6—6 of FIG. 2, which exemplifies a photo detector array of the present invention.

FIG. 7 is a schematic representation exemplifying a further process for fabricating the lens elements of the multi-element lens assembly with the selected radial displacements of the optical axes thereof.

DETAILED DESCRIPTION

The present invention is best understood by first considering a rotary optical coupler for transmitting, for example, an electrical signal from a rotatable member to a stationary member, using a single channel lens assembly. To this end, FIG. 1 displays a single channel rotary optical coupler 10 incorporating a rotatable light source 12, including a light emitting means 12a and a collimating lens 12b. The optical coupler 10 includes a stationary focusing lens 14, and a stationary light detector 15. A data signal such as a digital or analog video or data signal, the light emitting means 12a, whereby the signal is formed into a collimated light beam 18 composed of parallel light rays 16, by the collimating lens 12b. The collimated light beam 18 extends generally parallel to a conventional optical axis, which corresponds in FIG. 1 to a rotational axis 19. The light rays 16 are supplied to the stationary focusing lens 14, which focuses the collimated beam 18 to an image on a plane at a focal point 20 on a focal plane 22. The light detector 15 is disposed on the focal plane 22. As long as the rays 16 of the collimated light beam 18 are substantially parallel to the optical axis 19, the light beam 18 remains focused at the focal point 20 regardless of where the light rays 16 enter the lens 14. Furthermore, rotation of the rotatable light source 12 about axis 19 does not move the position of the image in the focal plane 22.

Although the optical coupler 10 is adequate for data transfer using a single electrooptical channel, multiple signal channel data transmission is required to provide substantially higher data transfer rates. However, adequate channel separation also must be provided when multiple data sources are used to supply multiple data signals to respective photo detectors via discrete data channels. However, in the multiple channel transmission of data from multiple rotary sources to a multiple photo detector array, a single element lens assembly would produce substantial data interference between data channels due to inadequate channel separation. While a fiber optic network can provide adequate channel separation for a multi-channel transmission system it does so with considerable complexity of design and at substantial cost, and a fiber optic rotary data source introduces additional complexities into the design of a rotary optical coupler.

In FIG. 2, a multi-channel rotary optical coupler 30 of the present invention achieves a rate of data transmission and a degree of channel separation comparable to the level achieved by a fiber optic network, but with the considerable advantages of simplicity of design and substantial cost reduction. In the multi-channel rotary optical coupler 30, multiple channels of light are transmitted through a unique multi-element lens assembly to be received as discrete channels on an associated multiple detector array.

More particularly, rotary multi-signal source assembly 31 includes several discrete data modulated, light sources 31a–d, (hereinafter termed "data sources" 31a–31d for convenience) mounted on a rotatable member 28, as further shown in FIG. 3. Each data source 31a–31d may comprise, for example, a light emitting diode (LED) 32a–32d and a corresponding collimating lens 33a–33d, with each data source receiving an electrical input such as a video or data signal, and generating a corresponding data modulated, light signal for a different numbered channel, i.e., channels 1 though 4. Each data source 31b–31d is displaced from a common rotational axis 37 of the coupler 30, while data source 31a is concentric with the rotational axis 37, as shown further in FIG. 3.

Referring also to FIG. 3, the data sources 31a–31d are secured on the rotatable member 28 at different locations and radii relative to the common rotational axis 37. Data source 31a is concentric with the axis 37, while the data source 31b is displaced from the axis 37 by a first radius. Data source 31c is displaced from the axis 37 a second radius larger than the first radius, while the data source 31d is displaced still a larger, third radius from the axis 37.

A stationary multi-element lens assembly 35 briefly depicted in FIG. 2, is best seen in FIG. 4 wherein lens elements 35a, 35b, 35c and 35d are shown as nested elements within the multi-element lens assembly 35. In the preferred embodiment described herein, each of the lens elements 35a through 35d has the same radius of curvature. However, the center of curvature of each lens element, and the corresponding optical axes 36a-36d, are laterally displaced about the common rotational axis 37 for each of the lens elements 35a through 35d of the lens assembly 35. In FIG. 4, the lens elements are depicted as annular lenses of substantially constant width, disposed concentrically about the common rotational axis 37. However, as further depicted, the optical axis of each lens element is radially displaced from the common rotational axis 37, as described below.

Thus as shown in FIG. 2, the rotary multi-signal source assembly 31, the lens assembly 35 and a photo detector array 40 (further described in FIG. 6,) are disposed along the common rotational axis 37. The array 40 is located at a focal plane 38 of the lens assembly 35.

Referring now to FIG. 4, the optical axis 36a of lens element 35a is displaced a distance E to the right of the common rotational axis 37 of the rotary optical coupler 30, with the assembly orientation as shown. Likewise, the optical axis 36b for lens element 35b is displaced a distance E above rotational axis 37 for the rotary coupler 30, optical axis 36c of lens element 35c is displaced a distance E to the left of the rotational axis 37, and optical axis 36d of lens element 35d is displaced a distance E below the rotational axis 37 of the rotary coupler 30. Thus, in a multi-lens assembly having four lens elements, the lens elements are radially displaced 90° from adjacent elements, about the axis 37. It may be seen that axis 37 is also the axis of symmetry of the circumferences of the lens elements. The distance E is a function of the desired convenience of the mechanical tolerances, the desired size of the optical coupler, etc.

FIG. 5 illustrates a process for fabricating the lens elements 35a-35d in accordance with the invention, to provide the radially displaced optical axes of the multiple lens elements within the lens assembly 35, relative to the common rotational axis 37 of the optical coupler 30. In FIG. 5, the third lens 35c is the one being manufactured by way of example, but any of the lens elements can be so formed. To this end, the process may start with an original simple plano-convex lens 38 of selected radius of curvature which matches the radii of curvature of the other lens elements 35a, b and d, and with an optical axis 36c. A suitable drill or cutting apparatus is used in conventional fashion to cut a circular portion 39 of selected diameter out of the lens 38. However, the center 37' of the portion 39 is not the same as the optical axis 36c of lens 38, but is displaced a radial distance E therefrom. That is, the center of the cutting device is displaced a distance E from the lens element optical axis 36c, such that the physical center of the portion 39, and thus of the lens element 35c, is likewise displaced a distance E radially from the true optical axis 36c. Then the outer perimeter of the lens element 35c is formed in concentric relation to the hole cut in the lens, by displacing a cutting device of selected larger diameter the distance E in the same radial direction, or by grinding the outer rim of lens 38 to provide the desired outer perimeter. This provides the annular lens element 35c with a substantially constant radial annular width, but wherein the optical axis 36c now is radially displaced from the physical center 37' of the lens element 35c by the distance E.

Each of the other lens elements 35a, b and d may be made by the same process described above using separate plano-convex lenses of suitable diameter and of similar radii of curvature. Each lens element is marked to indicate the position of maximum radius from the center, to facilitate their accurate assembly into the lens assembly 35. After suitable rotational adjustment as, for example, the 90° rotation from each other in this four lens, four channel, optical coupler depicted in FIG. 4, by way of example only, the lens elements 35a-35d are suitably glued, potted, etc., to produce the lens assembly 35. As may be seen in FIG. 2, the successively larger diameter lens elements are nested within each other along substantially a common plane. Before potting, the lens elements may be shifted axially in relation to each other to correct any inconsistencies in the focal lengths thereof, to allow each lens element to focus it's respective light beam on a common focal plane, thereby preventing spherical aberration.

The process of forming the lens elements depicted in FIG. 5 lends itself to the manufacture of all the lens elements 35a-35d using a single plano-convex lens of a diameter larger than the outer perimeter of the largest lens element. For example, in order to fabricate the four lens element assembly 35 exemplified herein, as depicted in FIG. 7, a lens 43, having a diameter sufficiently larger than the outer perimeter of the largest lens element 35d, is selected. The lens 43 has an optical axis which corresponds to the optical axes 36a-36d of the lens elements 35a-35d after fabrication. As previously described in FIG. 5, the center of the cutting device is displaced at a distance E from the optical axis of the lens 43, and the lens element 35a is cut out of the lens 39. Next, the lens element 35b is cut out concentrically about the center 37'. Then the lens elements 35c and 35d are cut out of the lens 39 concentrically about the center 37', leaving an outermost, non-concentric portion 41 which is discarded. Thus, the cutting process provides the four concentric lens elements 35a-35d with substantially constant annular widths, with each element having it's optical axis 36a-36d respectively, radially displaced from its physical center 37' by a distance E.

As previously described, the lens elements with equally displaced optical axes are next assembled together to provide the lens assembly 35 depicted in FIG. 4. First, the non-concentric lens element 35a is rotated 180° to place its physical center 37' to the left of its optical axis 36a, as depicted in FIG. 4. Next, lens element 35b is rotated 90° clockwise, to place its optical axis 36b immediately above it's physical center 37', and 90° counterclockwise from optical axis 36a. Lens element 35c is not rotated, but is left exactly as is with its optical axis 36c to the left of its physical center 37' and 90° counterclockwise from the optical axis 36b of the element 35b. Finally the lens element 35d is rotated 90° counterclockwise to place its optical axis 35d immediately below its physical center 37', and 90° between the optical axes 36c, 36a of either lens elements 35c, 35a, respectively. The lens elements 35a-35d then are suitably secured in place to define the multi-lens assembly 35 depicted, for example, in FIG. 4, wherein the physical centers 37' of all the lens elements are colinear with the common rotational axis 37 of the optical coupler 30, with the optical axes 36a–36d displaced a distance E radially about the axis 37 at 90° arcuate intervals.

The rotary optical coupler 30 includes the photo detector array 40 (FIGS. 2 and 6), which receives the discrete parallel channels of data modulated, light signals generated by LED's 32a to 32d of the rotary multi-signal source assembly 31. Provided in the common focal plane 38 of the photo detector array 40 are a series of diodes 40a to 40d for receiving the discrete parallel channels of light signals from LED's 32a to 32d. Diode 40a receives the data signal of LED 32a, with corresponding diodes 40b, 40c and 40d receiving the respective signals of LED's 32b, 32c and 32d. The placement of the lens elements 35a–35d and their respective optical axes 36a–36d within the lens assembly 35 so aligns the respective data sources 31a to 31d of the multi-signal source assembly 31 with the photo detector array 40 as to deliver discrete parallel channels of data signals to focal points 42a–42d on respective photo detectors 40a–40d. All focal points 42a–42d are generally disposed in the common focal plane 38 of the array 40. The photo detectors 40a–40d generate electrical signals corresponding to the electrical signals supplied to the data sources 31a–31d respectively.

It is noted that, in FIG. 2, the light from sources 31a and 31d are shown impinging the photo detector array 40 below and above the axis 37, respectively. This is done to clarify the manner in which the lens elements focus the light beams. The beams actually would impinge photo detectors 42a and 42d to the right and below the axis 37, respectively, as shown in FIG. 6.

The center of curvature of a respective lens element 35a is aligned so as to place its respective optical axis 36a so the data modulated, light signal of respective data source 31a is so transmitted through the lens element 35a as to input the respective discrete channel of data signal into the detector 40a. As particularly shown in FIG. 6, the photo detector 40a is disposed in the common focal plane 41 of the detector array, but is displaced the distance E to the left of the common rotational axis 37 of the lens assembly 35. The respective photo detectors 40b, 40c, 40d are similarly laterally displaced the distance E about the axis 37 so as to align the respective photo detectors with the lens elements 35b, 35c, 35d. Thus, the lens elements transmit light data from the light sources 31a–31d, to respective detectors 40a–40d of the array 40, via discrete optical data channels.

It may be seen that the invention combination includes the positioning of the data channels 31a–d about the rotational axis 37 of the rotary source device 31, the positioning of the respective axes 36a–36d of lens elements 35a to 35d about the common rotational axis 37 of the rotary optical coupler 30, and the positioning of the detectors 42a–42d of the photo detector array 40 about the axis 37, in a substantially common focal plane 38. This configuration achieves the transfer of multiple parallel channels of data with a minimum of crosstalk between data channels.

The above-described array uses simple lens elements rather than a fiber optic coupler, thereby providing a system having substantially less complexity, with substantially less expense, and with a notable reduction in mechanical tolerances. For example, the axial tolerances between the rotating and stationary elements of the optical coupler may be greater than 20 mils rather than less than 1 mil such as required for a rotary transformer. In this optical coupler radial tolerances of the light sources and lens annuli may be on the order of ±5 mils, which is readily attainable.

Having described a preferred embodiment of the invention it should be understood that other variations are possible. For example, laser diodes could be used in place of the light emitting diode assemblies 31, different lens configurations could be employed, and/or the detector array 40 could use different components or take an alternate form.

The invention combination has been described herein with the light emitting data sources disposed on the rotating member, and the photo detector array on the stationary member as, for example, in a playback mode of a tape recorder wherein rotating heads are reading the magnetic history on a tape. However, the data sources and the photo detector array can be interchanged, whereby data flows from the stationary to the rotatable member as, for example, in a record mode of a tape recorder.

Although four data channels employing four of each of the optical components are shown in the description herein, it is to be understood that any number of channels, including a single data channel such as in FIG. 1, are contemplated, using the associated number of optical components.

Accordingly the scope of the invention is to be defined by the appended claims.

What is claimed is:

1. A rotary optical coupler having a common rotational axis, comprising:
    a rotary light source including a plurality of data emitting light sources rotatable relative to the common rotational axis, for generating respective data signals;
    a lens assembly including multiple annular lens elements having discrete optical axes, with the optical axis of each lens element being radially displaced a selected distance about said common rotational axis; and
    a photo detector array including multiple photo detectors radially displaced about said common rotational axis commensurate with the displacement of respective lens elements and at said selected distance, to receive a respective data signal from the light sources via a respective lens element of the lens assembly.

2. The coupler of claim 1 wherein the optical axis of each lens element of the lens assembly is displaced radially from the common rotational axis at selected angular intervals from each other about the axis.

3. The coupler of claim 1 wherein:
    the rotary light source includes n discrete light sources;
    the lens assembly includes n lens elements, with the optical axis of each lens element displaced a selected distance from, and at selected angular placements about, the common rotational axis of the optical coupler; and
    said photo detector array includes n photo detectors displaced a similar selected distance about the common rotational axis, and substantially within a common focal plane, wherein each photo detector receives a respective data signal.

4. The coupler of claim 1 wherein:
    the rotary light source includes four light sources for generating four discrete data modulated light signals;

the lens assembly includes four lens elements, with the optical axis of each lens element displaced at 90° angular intervals and at a distance E from the common rotational axis; and the photo detector array includes four photo detectors similarly displaced at the distance E about said rotational axis in optical alignment with respective lens elements, for receiving respective discrete data modulated light signals from the light sources via respective lens elements of the lens assembly.

5. The coupler of claim 4 wherein the first optical axis of a first lens element is disposed a distance E to the right of the rotational axis, a second optical axis of a second lens element is disposed a distance E above the rotational axis, a third optical axis of a third lens element is disposed a distance E to the left of the rotational axis, and a fourth optical axis of a fourth lens element is disposed a distance E below the rotational axis.

6. The coupler of claim 1 wherein each lens element having said discrete optical axes and forming the lens assembly, has the same radius of curvature.

7. The coupler of claim 1 wherein the data emitting light sources comprise light emitting diodes.

8. The coupler of claim 1 wherein the data emitting light sources comprise laser diodes.

9. The coupler of claim 1 wherein:
each lens element has the same focal length and a continuous circular optical path;
each lens element continuously receives along its continuous circular optical path a data signal from a respective data emitting light source as it rotates and transmits the data signal to a common focal plane; and
each photo detector continuously receives at a focal point in said common focal plane the data signal from its respective lens element.

10. A rotary optical coupler having a common rotational axis, comprising:
light means rotatable about said common rotational axis for generating an optical data modulated light signal;
lens means having an optical axis and a continuous circular optical path for receiving said optical data modulated light signal, wherein the optical axis of the lens means is parallel to, but not colinear with, the common rotational axis; and
optical detector means also not colinear with the common rotational axis, for receiving at a focal point thereon the data modulated light signal from said lens means as the rotatable light means rotates.

11. The coupler of claim 10 wherein:
said rotatable light means includes a plurality of light sources for generating a plurality of optical data modulated light signals;
said lens means includes a plurality of lens elements disposed substantially within a common plane with their respective optical axes radially displaced about the common rotational axis; and
said optical detector means includes a plurality of photo detectors radially displaced about the common rotational axis.

12. The coupler of claim 11 including:
means for supplying electrical data signals; and
said light sources convert said electrical data signals into said respective optical data modulated light signals.

13. The coupler of claim 11 wherein:
said plurality of lens elements are of similar radius of curvature, wherein each optical axis of each lens element is selectively radially displaced about the common rotational axis at equally spaced angular locations.

14. The coupler of claim 11 wherein:
said plurality of photo detectors are disposed in a common focal plane for receiving the optical data modulated light signals from respective lens elements at the respective non colinear focal points thereon.

15. The coupler of claim 14 wherein said photo detectors convert their respective optical data signals back to electrical data modulated light signals.

16. A method for optically coupling data signals between rotatable and stationary members, comprising the steps of:
generating a plurality of optical signals rotating relative to a common rotational axis at respective different radii;
disposing a plurality of substantially coplanar discrete annular lenses of progressively graduated diameters with their optical axes in non colinear relation about the common rotational axis to define a like plurality of continuous circular optical lens paths about the common rotational axis, said lens paths having radii corresponding to the radii of the respective rotating optical signals;
focusing the plurality of optical signals to respective constant focal points disposed in a common focal plane; and
recovering the data signals in response to the focused optical signals.

17. The method of claim 16 wherein the step of disposing includes displacing the continuous circular optical lens paths in coplanar relation with their respective optical axes displaced a selected distance radially about the common rotational axis at equally spaced annular locations.

18. The method of claim 17 including:
forming discrete optical data channels via the displaced continuous circular optical lens paths, said channels being confined to said radii relative to the common rotational axis; and
receiving the optical signals at said respective constant focal points upon the generation of the rotating optical signals.

* * * * *